United States Patent

[11] 3,598,966

[72] Inventors Jerry A. Combs
West Carrollton;
John W. Fecher, Kettering, both of, Ohio
[21] Appl. No. 740,562
[22] Filed June 27, 1968
[45] Patented Aug. 10, 1971
[73] Assignee The National Cash Register Company
Dayton, Ohio

[54] CLOCK GENERATION ERROR-CHECKING MEANS
11 Claims, 5 Drawing Figs.

[52] U.S. Cl. .......... 235/61.11 E, 73/157
[51] Int. Cl. .......... G06k 7/10
[50] Field of Search .......... 235/61.115, 61.111, 61.11; 340/149; 73/157

[56] References Cited
UNITED STATES PATENTS
3,142,829 7/1964 Comstock .......... 340/174.1 A UX
3,067,934 12/1962 Amacher et al. .......... 235/61.115
3,222,501 12/1965 Wood .......... 235/61.115

*Primary Examiner*—Maynard R. Wilbur
*Assistant Examiner*—William W. Cochran
*Attorneys*—Louis A. Kline and Albert L. Sessler, Jr.

ABSTRACT: Means for preventing an undetected loss of data from tape being sensed by a tape-sensing device, which loss may occur when a sprocket hole being used for clocking purposes is obstructed or defective so that a clock signal cannot be generated therefrom. The addition of a sprocket-hole sensing device and electrical circuitry for generation of an error signal in response to failure to sense the sprocket hole enables a check to be made in advance as to whether or not the sprocket hole of a frame of data to be subsequently sensed is unobstructed. If a satisfactory signal is obtained from sensing of the sprocket hole, then sensing of the tape by the tape-sensing device proceeds normally. However, if the sprocket hole in question is obstructed or defective, then the normal sensing signal is not produced by the added sprocket-hole-sensing device, and an error signal is generated.

INVENTORS
JERRY A. COMBS &
JOHN W. FECHER

BY Louis A. Kline
Albert L. Sessler, Jr.
THEIR ATTORNEYS

CLOCK GENERATION ERROR-CHECKING MEANS

BACKGROUND OF THE INVENTION

This invention relates to means for generating a clock signal from indicia on a record medium which an be used in sampling data sensed from the record medium, and more particularly relates to means for generating an error signal in the event that said indicia cannot be properly sensed from the record medium for generation of a clock signal.

A widely used means of generating clock signals, when sensing data from record media, such as perforated tape, has been to sense timing indicia, such as sprocket holes, from the tape, and to produce clock signals based upon the sensing of one or more such indicia, for use in sampling the data simultaneously sensed from the record media. One such arrangement is shown in U.S. Pat. No. 3,067,934, issued Dec. 11, 1962, inventors Gene L. Amacher et. al., assigned to the assignee of the present invention. In that patent, a clock signal is developed by means of sensing two adjacent sprocket holes in a perforated tape, and combining these signals to produce a clock signal for the sampling of data signals produced from data-representing perforations on the tape.

One problem present in systems using the sprocket holes of perforated tape, or other timing indicia in other types of record media, for the generation of clock signals is that if a sprocket hole is obstructed, or other timing indicia is similarly rendered incapable of being sensed, no clock signal is generated corresponding to that aperture or other indicia, and data from the record media may consequently be lost in the sensing operation.

SUMMARY OF THE INVENTION

The present invention provides means to prevent an undetected loss of data such as mentioned above. An additional clock-sensing device is incorporated in the sensing mechanism, for sensing of the sprocket hole or other timing indicia associated with a "frame" or "character" of data which has not yet been advanced to the data-sensing station. This enables a check to be made in advance as to whether or not this sprocket hole, or other timing indicia, is in a condition to furnish a satisfactory clocking signal when it reaches the data-sensing portion of the sensing mechanism. The signal generated by this additional clock-sensing device is introduced into a circuit with the normally derived clock signal in such a manner that an error signal is produced if a proper signal is not produced by the additional clock-sensing device at the same time that the normally derived clock signal is produced. In the absence of an error signal, record media sensing proceeds normally. However, if an error signal is generated, operation of the record media sensing device may be halted by such a signal, if desired, or other appropriate action may be taken, so as to prevent the loss of data associated with the faulty sprocket hole or timing indicia. It should be noted that although the illustrated embodiment herein shows the use of optical sensing means in cooperation with perforated tape to generate clock signals and to provide for generation of an error signal in the event of an obstructed sprocket hole, the invention is equally applicable to other types of record media, sensing means, and clock generation means, such as, for example, magnetic record media, in which the data and clock information is stored by magnetic discontinuities in the media.

It is accordingly an object of the present invention to provide means for preventing loss of data from record media by a record media sensing device.

A further object is to provide means to detect a faulty sprocket hole or other timing indicia on record media being sensed.

BRIEF DESCRIPTION OF THE DRAWING

With these and other objects, which will become apparent from the following description, in view, the invention includes certain novel features of construction and combinations of parts, one form or embodiment of which is hereinafter described with reference to the drawing which accompanies and forms a part of this specification.

In the drawing.

DESCRIPTION OF THE PREFERRED EMBODIMENT

Figure 2:
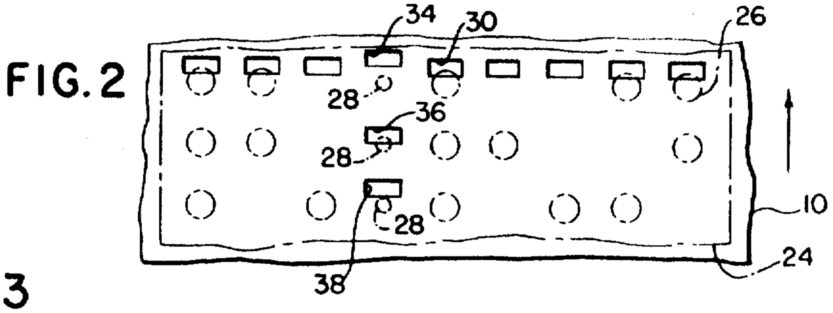
FIG. 2 is a schematic representation of a sensing station with a section of perforated tape in phantom lines superimposed to illustrate the physical relationship of the various perforations in the tape with the corresponding clock and data apertures in the sensing station.
Figure 4:
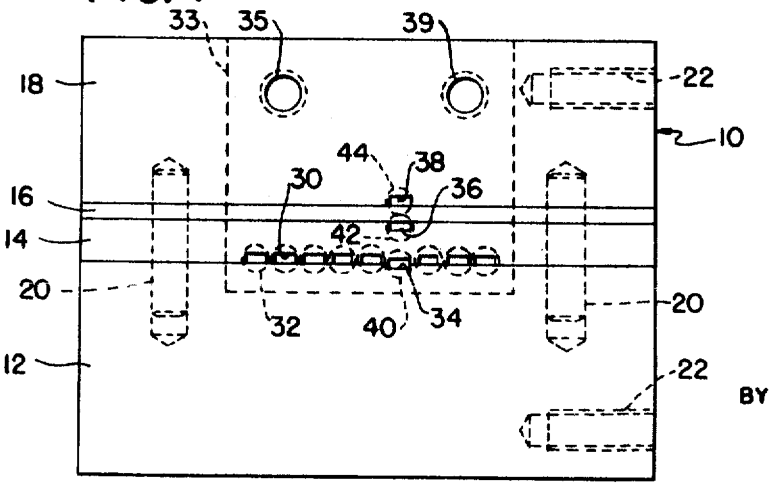
FIG. 4 is a top plan view of a tape-sensing station showing the various apertures for sensing the sprocket holes and data holes in the tape, and also showing the associated sensing means for sensing perforations in the tape as it moves over the sensing station.

Referring now to FIGS. 2 and 4, the physical arrangement of a sensing station embodying the present invention will be described. A sensing station 10 is shown as made up of a plurality of blocks, 12, 14, 16 and 18, of metal or other suitable material. The use of a plurality of blocks facilitates the machining operations required to provide the necessary sensing apertures in the station. However, the sensing station could, if desired, be made of a single block, as, for example, by molding or machining, or in any other suitable manner. The various blocks 12, 14, 16, and 18 of the illustrated embodiment are retained together in proper alignment by means such as the aligning pins 20, and are secured together by adhesive bonding or other suitable means. The station as a unit is mounted in the record media handling device by screws 22 or other appropriate securing means.

Figure 5:
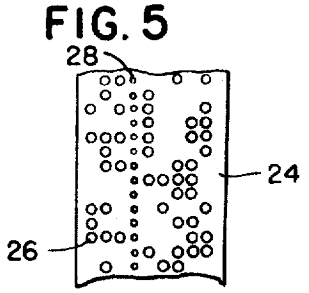
FIG. 5 is a fragmentary view showing a typical section of perforated tape.

In the illustrated embodiment, the record media handling device is designed to sense information from a perforated tape having eight information channels and one channel of sprocket holes, such as the tape 24, shown in FIG. 5, having data perforations 26 and sprocket perforations 28. The type of record medium shown is merely illustrative, since the invention could readily be applied to record media of other type and capacity.

One data aperture 30 is provided in the sensing station 10 for each data channel contained on the tape 24. Positioned directly beneath each data aperture 30 is a solar cell 32 for sensing data perforations in the tape 24 as it moves past the sensing station. Other suitable radiation-sensitive sensing means, such as photodiodes, for example, could be used in place of the solar cells, if desired.

In addition, three clock apertures 34, 36, and 38, aligned in the direction of tape movement, are provided to enable sensing of sprocket perforations 28 in the tape 24, by three solar cells 40, 42, and 44 positioned beneath said clock apertures. Here also, alternative sensing means, such as photodiodes, could be employed if desired. The physical locations of the clock apertures with respect to each other, and with respect to the line of data apertures 30, are such as to provide the desired relative timing in the sensing of sprocket perforations 28 of the tape 24, as will subsequently be described in greater detail. In the illustrated embodiment, all of the solar cells 32, 40, 42, and 44 are fixed in a block 33, which is secured to the block 18 of the station 10 by screws 35 and 39, or other appropriate securing means.

Figure 1:
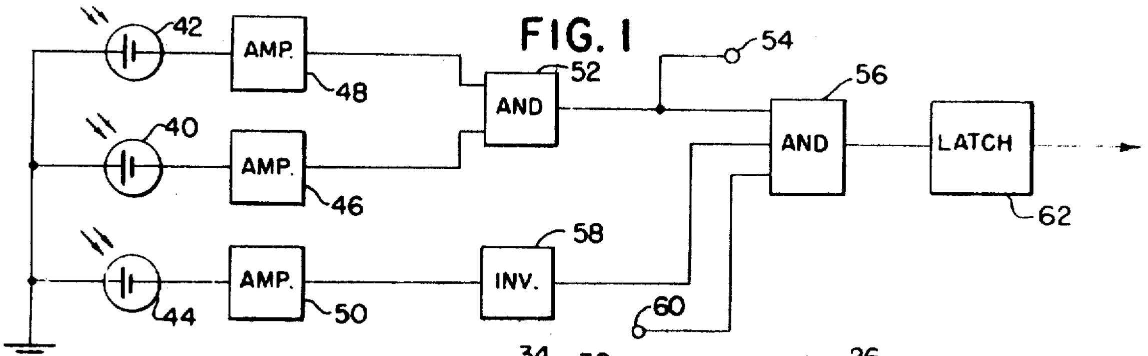
FIG. 1 is a logical block diagram of a clock-signal- and error-signal-generating system constructed in accordance with the principles of the present invention.

The clock-generating and error control circuit in which the solar cells 40, 42, and 44 are employed is shown in FIG. 1, in which it will be noted that one element of each of the cells is connected to a base reference potential, shown as ground, while the other element of each cell is connected to an amplifying and shaping device 46, 48, and 50, shown in block form, for amplifying and shaping the signal generated by each cell in accordance with the amount of radiation impinging thereon. The amplifying and shaping device may be of any conventional structure, and can conveniently consist of an amplifying circuit connected to a Schmitt trigger circuit, so that the signal produced by the solar cells is amplified and shaped into a "squared" configuration.

The amplified and squared output signals from the amplifiers 46 and 48 are applied to the input terminals of an AND gate 52, the output of which is divided into two branches, one extending to an output terminal 54, from which a clock output signal may be taken, while the other branch is connected to one input terminal of a further AND gate 56. The amplified and squared output signal from the amplifier 50 is applied to an inverter 58, and the inverted output therefrom is applied to a second input terminal and the AND gate 56. A third input terminal of the AND gate 56 is shown as being connected to a further input terminal 60, to which may optionally be applied a control signal of any desired character, such as a data strobe signal which is applied to the AND gate to insure that an output signal will be produced only at a time which is compatible with the requirements of the remainder of the system in which the circuit of FIG. 1 is employed. The output signal from the AND gate 56 may be employed directly as an error signal if desired, or may be applied to a further device, such as a latch 62, which, upon receipt of a positive-going signal from the AND gate 56, is set to a condition in which it then provides an output signal of a positive value until it is reset by a signal from some other source, such as a control signal, or a signal generated by restarting of the data-handling means after it has been stopped to clear the sprocket hole of the tape which produced the error signal in the first place. As an alternative to a latch structure, the device 62 may also be a flip-flop or other similar bistable element, if desired.

The AND gates 52 and 56, the inverter 58, and the latch or flip-flop 62 described above are all of conventional design, such as has been described in the previously mentioned Amacher et al. U.S. Pat. No. 3,067,934, for example, and consequently no need is seen to specifically describe the circuit details of these elements.

The operation of the novel sensing station of the present invention will now be described, with particular reference to the diagrammatic showing of the station 10 and the tape 24 in FIG. 2, and the various waveforms shown in FIG. 3. Inspection of FIG. 2 shows that, as the tape 24 moves in the direction of the arrow with respect to the sensing station 10, the leading edge of a sprocket hole 28 passes over the rear edge of the clock aperture 36 slightly before data perforations 26 for the data "frame" to be sensed pass over the rear edges of the data apertures 30. Since the voltage generated by the solar cells is proportional to the total amount of radiation falling thereon, and since the area of a data perforation is larger than the area of a sprocket perforation, the voltage threshold for triggering the amplifiers (not shown) for the data cells 32 to produce a positive output signal is reached shortly before the same threshold is reached for the amplifier 48 associated with the clock solar cell 42. This is shown in FIG. 3, in which the waveform for a data solar cell, as amplified, is shown as rising from its lower to its upper logic level very slightly before the waveform for the signal produced by the amplifier 48.

At a slightly later point in time, as movement of the tape continues, assuming that the sprocket perforation 28 being sensed is unobstructed, a voltage is generated by the solar cell 44 associated with the clock aperture 38, as the sprocket hole being sensed passes over it. The output from the cell 44 is amplified and shaped by the amplifier 50 to produce a signal represented on the left side of the break in the corresponding waveform shown in FIG. 3.

Figure 3:
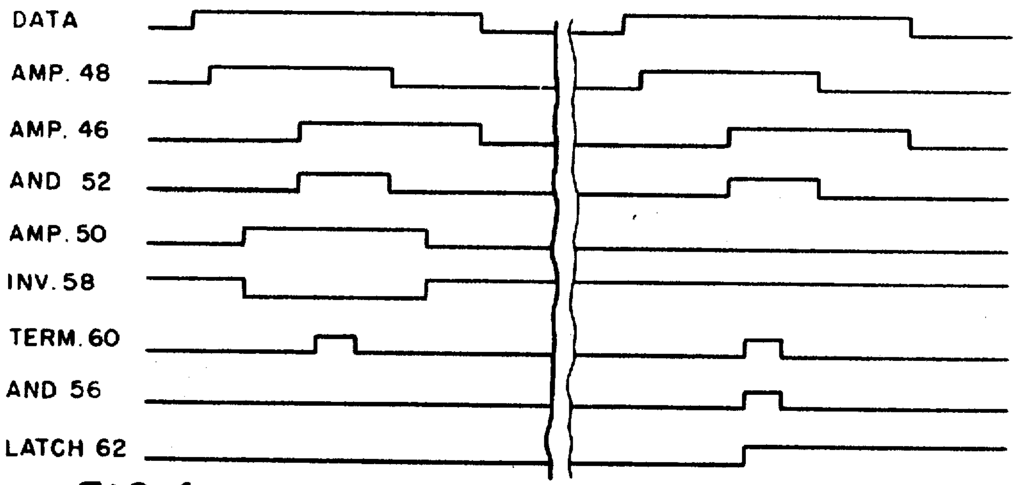
FIG. 3 shows a plurality of waveforms associated with various elements of the system shown in the diagram of FIG. 1.

Further continuation of movement of the tape 24 in the direction of the arrow in FIG. 2 brings the sprocket hole of the frame of data being sensed over the clock aperture 34 and causes its associated solar cell 40 to generate a voltage which is amplified and shaped by the amplifier 46 to produce a signal represented by the corresponding waveform shown in FIG. 3.

The manner in which these various generated waveforms are combined by the circuit of FIG. 1 to provide the desired clock and error signals will now be described. The clock signal appearing on the terminal 54 is provided by applying the output signals from the amplifiers 46 and 48 to the input terminals of the AND gate 52, so that the resulting output signal, as shown in FIG. 3, represents the relatively short time interval when a signal is being generated by both of the solar cells 40 and 42, by virtue of portions of sprocket holes simultaneously passing over both of the clock apertures 34 and 36, in the manner shown and described in the previously cited U.S. Pat. No. 3,067,934, to Amacher et al. This clock signal may be utilized for sampling the data signals generated by the solar cells 32, in a well-known manner, or for any other desired purpose. The same clock signal that appears on the terminal 54 is applied over a second branch to one input terminal of the AND gate 56.

At the same time, the third clock signal generated by the solar cell 44, amplified and shaped by the amplifier 50, and inverted by the inverter 58, to provide the waveform shown in association with the legend "INV. 58" on the left side of FIG. 3, is applied to a second input terminal of the AND gate 56. The previously described third input to the AND gate 56 is applied to the terminal 60, and may take the form of a "data strobe" or timing signal, which is used to limit the generation of an error output signal by the AND gate 56 to a desired interval of time, and to prevent the generation of spurious error signals.

Due to the inverter 58, a signal generated by the solar cell 44 from passage of a sprocket hole in the tape thereover will appear as a lower logic level signal on the input terminal of the AND gate 56, as shown on the left side of FIG. 3, and will thereby prevent generation of an "error" signal.

On the other hand, when a sprocket hole in the tape is plugged or is otherwise defective, no signal, or an insufficient signal, is generated by the solar cell 44. This condition is illustrated by the various waveforms shown to the right of the break in the waveforms of FIG. 3. When no signal, or an insufficient signal, is generated by the solar cell 44, a signal at the lower logic level appears at the output of the amplifier 50 and is inverted by the inverter 58 to produce an upper logic level signal to be applied to the AND gate 56. Application of this signal to the AND gate, in combination with a clock signal from the AND gate 52 and a control signal from the terminal 60, results in an "error" signal output from the AND gate 56. This signal may be applied directly to a utilizing device, or may be used to set the latch 62 to produce an upper logic level signal which remains at its upper logic level until action is taken to rectify the error condition, said signal taking the form shown on the right side of FIG. 3.

As previously mentioned, the "error" signal may be used in any appropriate manner. One such use is to halt operation of the tape-sensing device. Since the error is sensed in the second frame back or "upstream" on the tape from the frame being sensed for data at the time, an ample time interval is provided for stopping of the tape before the "frame" of data associated with the faulty sprocket hole passes over the sensing station. Loss of data is thus prevented, and operation of the tape-sensing device may be resumed once the faulty sprocket hole condition has been corrected.

It should be noted that a tape-handling device embodying the novel sensing station of the present invention will also function in the generation of clock signals and the sensing of data from a tape moving in a direction opposite to that described above. In such a case, any error in sensing resulting from an obstructed or otherwise defective sprocket hole would not be detected until after the sprocket hole in question passed the data-sensing portion of the sensing station.

While the form of mechanism shown and described herein is admirably adapted to fulfill the objects primarily stated, it is to be understood that it is not intended to confine the invention to the form or embodiment disclosed herein, for it is susceptible of embodiment in various other forms.

What we claim is:

1. An information-sensing device for sensing perforations in a clock channel and a plurality of data channels of a record medium as it traverses a sensing station having a clock-sensing channel for sensing clock perforations and a plurality of data-sensing channels for sensing data perforations, comprising, in combination, a supporting member on which the record medium is adapted to move, said supporting member including first, second, and third clock apertures therein, positioned in a single sensing channel for sensing of perforations in that channel, and displaced with respect to each other in the direction of record medium movement, the distance between the leading edges of the first and second of said clock apertures being slightly greater than the distance between the leading edges of successive perforations in the clock channel of the record medium, and the distance between the leading edges of the second and third of said apertures being slightly less than the distance between the leading edges of successive perforations in the clock channel of the record medium, said supporting member also including a plurality of data apertures therein, with their leading edges located in a line perpendicular to the direction of record medium movement and positioned between the leading edges of the first and second clock apertures;

first, second, and third radiation-sensitive clock-sensing means capable of translating radiation directed thereon, through perforations in the clock channel of the record medium, and through said first, second, and third clock apertures, into electrical clock-sensing signals;

a plurality of radiation-sensitive data-sensing means capable of translating radiation directed thereon, through perforations in the data channels of the record medium and through said data apertures, into electrical data-sensing signals;

clock-generating means for combining the clock-sensing signals generated by said first and second radiation-sensitive clock-sensing means to produce a clock signal for sampling the data-sensing signals; and error signal means for producing an error signal in the event that no sensing signal is generated by the third radiation-sensitive clock-sensing means at the time that the sensing signals generated by the first and second radiation-sensitive clock-sensing means are combined to produce a clock signal.

2. An information-sensing device for sensing perforations in at least one channel in a record medium as it traverses a sensing station having at least one sensing channel for sensing said perforations, comprising, in combination, a supporting member on which the record medium is adapted to move, said member including first, second, and third apertures therein, positioned in a single sensing channel for sensing of perforations in that channel, and displaced with respect to each other in the direction of record medium movement;

first, second, and third radiation-sensitive means capable of translating radiation directed thereon, through perforations in the record medium, and through said first, second, and third apertures, into sensing signals, said third radiation-sensitive means and associated aperture being located upstream of the first and second radiation-sensitive means and associated apertures with respect to movement of the record medium to provide an anticipatory error signal before a defective perforation reaches the first and second radiation-sensitive means and associated apertures;

clock-generating means for combining the sensing signals generated by said first and second radiation-sensitive means to produce a clock signal; and error signal means connected to the clock-generating means and to the radiation-sensitive means associated with said third aperture for producing an error signal in the event that no sensing signal is generated by the third radiation-sensitive means at the time that the sensing signals generated by the first and second radiation-sensitive means are combined to produce a clock signal.

3. The information-sensing device of claim 2, in which the distance between the leading edges of the first and second of the apertures in said supporting member differs from the distance between the leading edges of successive perforations in said channel of the record medium.

4. The information-sensing device of claim 2, in which said supporting member also includes a plurality of data apertures therein, said sensing device also including a plurality of radiation-sensitive data-sensing means capable of translating radiation directed thereon, through data perforations in the record medium, and through said data apertures, into data-sensing signals, which are capable of being sampled under control of said clock signal.

5. An information-sensing device for sensing indicia in at least one channel in a record medium as it traverses a sensing station having at least one sensing channel for sensing said indicia, comprising, in combination, first, second, and third sensing means positioned in a single sensing channel for sensing of indicia in that channel, and displaced with respect to each other in the direction of record medium movement, said sensing means being capable of producing sensing signals in response to said indicia, said third sensing means being located upstream of the first and second sensing means with respect to movement of the record medium to provide an anticipatory error signal before a defective indicium reaches the first and second sensing means;

clock-generating means for combining the sensing signals generated by said first and second sensing means to produce a clock signal; and error signal means connected to the clock-generating means and to the third sensing means for producing an error signal in the event that no sensing signal is generated by the third sensing means at the time that the sensing signals generated by the first and second sensing means are combined to produce a clock signal.

6. The information-sensing device of claim 5, in which the sensing means are radiation-sensitive elements for sensing perforations which constitute the indicia in the record medium.

7. The information-sensing device of claim 5, in which the distance between the first and second sensing means differs from the distance between successive indicia in said channel of the record medium.

8. The information-sensing device of claim 5, in which said sensing device also includes a plurality of data-sensing means capable of translating data indicia in the record medium into data-sensing signals, which are capable of being sampled under control of said clock signal.

9. The information-sensing device of claim 8, in which said data-sensing means are arranged in a line perpendicular to the direction of record medium movement, and positioned between the first and second sensing means.

10. An information-sensing device for sensing perforations in at least one channel in a record medium as it traverses a sensing station having at least one sensing channel for sensing said perforations, comprising, in combination, a supporting member on which the record medium is adapted to move, said member including first, second and third apertures therein, positioned in a single sensing channel for sensing of perforations in that channel, and displaced with respect to each other in the direction of record medium movement, the distance between the leading edges of the first and second apertures in said supporting member being slightly greater than the distance between the leading edges of successive perforations in said channel of the record medium, and the distances between the leading edges of the second and third of the apertures in said supporting member being slightly less than the distance between the leading edges of successive perforations in said channel of the record medium;

first, second, and third radiation-sensitive means capable of translating radiation directed thereon, through perforations in the record medium, and through said first, second, and third apertures, into sensing signals;

clock-generating means for combining the sensing signals generated by said first and second radiation-sensitive means to produce a clock signal; and error signal means connected to the clock-generating means and to the radiation-sensitive means associated with said third aperture for producing an error signal in the event that no sensing signal is generated by the third radiation-sensitive means at the time that the sensing signals generated by the first and second radiation-sensitive means are combined to produce a clock signal.

11. An information-sensing device for sensing indicia in at least one channel in a record medium as it traverses a sensing station having at least one sensing channel for sensing said indicia, comprising in combination, first, second and third sensing means positioned in a single sensing channel for sensing of indicia in that channel, and displaced with respect to each other in the direction of record medium movement, said sensing means being capable of producing sensing signals in response to said indicia, the distance between the first and second sensing means being slightly greater than the distance between successive indicia in said channel of the record medium, and the distance between the second and third sensing means being slightly less than the distance between successive indicia in said channel of the record medium;

clock-generating means for combining the sensing signals generated by said first and second sensing means to produce a clock signal; and error signal means connected to the clock-generating means and to the third sensing means for producing an error signal in the event that no sensing signal is generated by the third sensing means at the time that the sensing signals generated by the first and second sensing means are combined to produce a clock signal.